United States Patent
Zhang (10) Patent No.: US 9,505,144 B2
(45) Date of Patent: Nov. 29, 2016

(54) PIERCING MECHANISM OF BREAD MAKER

(71) Applicant: Tsann Kuen (Zhangzhou) Enterprise Co., Ltd., Fujian (CN)

(72) Inventor: Zhong-Hua Zhang, Fujian (CN)

(73) Assignee: Tsann Kuen (Zhangzhou) Enterprise Co., Ltd., Zhangzhou, Fujian (CN)

( * ) Notice: Subject to any disclaimer, the term of this patent is extended or adjusted under 35 U.S.C. 154(b) by 158 days.

(21) Appl. No.: 14/605,527

(22) Filed: Jan. 26, 2015

(65) Prior Publication Data
US 2016/0089805 A1 Mar. 31, 2016

(30) Foreign Application Priority Data
Sep. 30, 2014 (CN) .......................... 2014 1 0525178

(51) Int. Cl.
*A47J 37/01* (2006.01)
*B26D 5/02* (2006.01)
*B26D 1/04* (2006.01)
*A21B 7/00* (2006.01)

(52) U.S. Cl.
CPC ................. *B26D 5/02* (2013.01); *A21B 7/005* (2013.01); *A47J 37/01* (2013.01); *B26D 1/045* (2013.01)

(58) Field of Classification Search
CPC .......... A47J 37/01; B26D 1/045; B26D 5/02
See application file for complete search history.

(56) References Cited

U.S. PATENT DOCUMENTS 8,568,810 B2 * 10/2013 Wen ...................... A47J 37/015
426/115

* cited by examiner

*Primary Examiner* — Sean Michalski
*Assistant Examiner* — Liang Dong
(74) *Attorney, Agent, or Firm* — Muncy, Geissler, Olds & Lowe, P.C.

(57) ABSTRACT

A piercing mechanism configured to pierce a sealing film of a bread ingredient box includes a bottom seat, a top seat disposed above the bottom seat for supporting the bread ingredient box, and a sawtooth blade disposed on an inner side of the bottom seat. A plurality of spaced-apart support units are disposed on the bottom seat, and each includes an outer support tube, an inner post inserted into the outer support tube and extending out of the bottom seat for abutting against a housing of a bread maker, an outer spring having two opposite ends respectively abutting against the top and bottom seats, and an inner spring having two opposite ends respectively abutting against the inner post and the outer support tube.

5 Claims, 9 Drawing Sheets

PIERCING MECHANISM OF BREAD MAKER

CROSS REFERENCE TO RELATED APPLICATION

This application claims priority of Chinese Patent Application No. 201410525178.8, filed on Sep. 30, 2014.

FIELD OF THE INVENTION

The invention relates to a bread maker, and more particularly to a piercing mechanism of a bread maker.

BACKGROUND OF THE INVENTION

Figure 1:
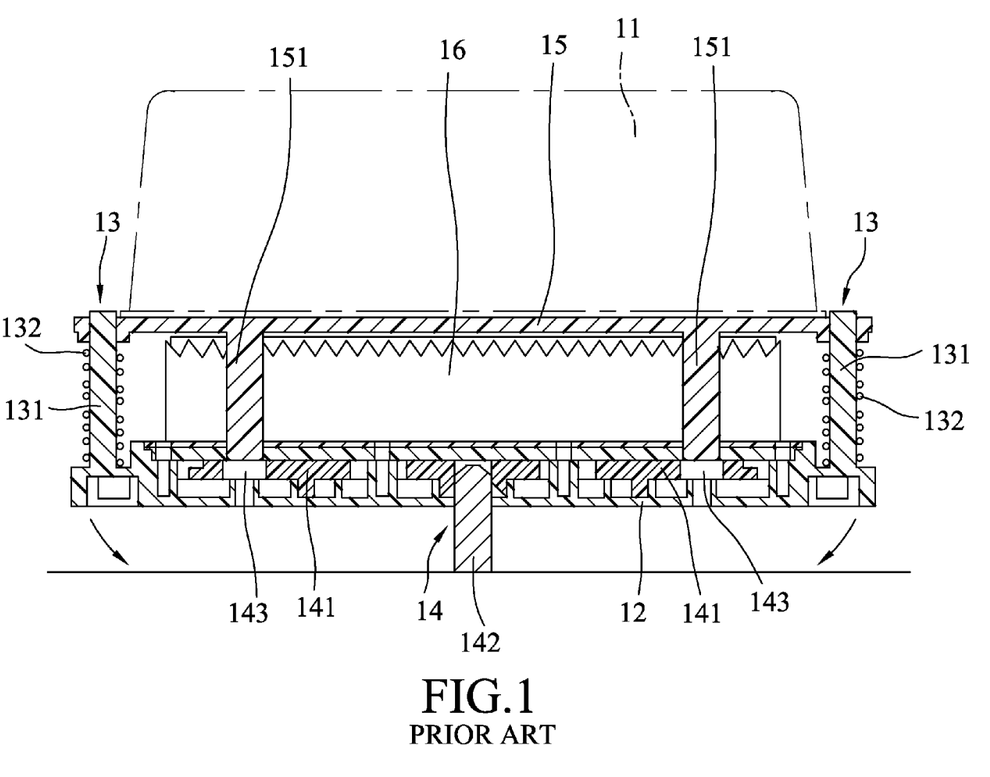
FIG. 1 is a sectional view of a conventional piercing mechanism of a bread maker.

FIG. 1 illustrates a conventional piercing mechanism of a bread maker suitable for use in piercing a bread ingredient box 11 so that bread ingredients contained in the bread ingredient box 11 may fall therefrom. The piercing mechanism includes a bottom seat 12 having a hollow rectangular cross section, four support units 13 disposed at four corners of the bottom seat 12, two limiting units 14 respectively disposed on two opposite sides of the bottom seat 12, a top seat 15 spaced apart from the bottom seat 12, and a sawtooth blade 16 disposed on an inner side of the bottom seat 12.

Each support unit 13 includes a support rod 131 extending upward from a respective corner of the bottom seat 12, and a spring 132 sleeved on the support rod 131. Each limiting unit 14 includes two limiting pieces 141 spaced apart in a left-right direction, and a control piece 142 disposed on a housing of the bread maker. Each limiting piece 141 has a limiting hole 143 distal to the other limiting piece 141. The control piece 142 has an arrow-shaped top end removably inserted between the limiting pieces 141.

The top seat 15 has a hollow rectangular cross section, and four corners formed with four holes that are respectively inserted into the support rods 131 of the support units 13 and abutting against top ends of the springs 132 of the support units 13. The top seat 15 further has two pairs of limiting rods 151 respectively and oppositely disposed on two sides of the top seat 15.

When the bread ingredient box 11 is placed on the top seat 15, the top and bottom seats 15, 12 move downward simultaneously, and the control piece 142 is inserted into the bottom seat 12 to push the limiting pieces 141 away from each other. At this time, the limiting rods 151 of the top seat 15 are respectively inserted into the limiting holes 143 of the limiting pieces 141, so that the top seat 15 can move downward relative to the bottom seat 12, and the sawtooth blade 16 can pierce the bread ingredient box 11 disposed on the top seat 15.

However, because the bottom seat 12 is supported only by the control pieces 142 of the limiting units 14, the bottom seat 12 is unstable and is likely to rock. Further, when the conventional piercing mechanism is assembled to or removed from the bread maker, the user's hands are likely to get injured.

SUMMARY OF THE INVENTION

An object of this invention is to provide a piercing mechanism of a bread maker that is capable of overcoming the aforesaid drawbacks of the prior art.

Accordingly, a piercing mechanism of a bread maker of this invention is suitable for disposing within a housing of a bread maker and is configured to pierce a sealing film of a bread ingredient box. The piercing mechanism comprises a bottom seat, a top seat disposed above the bottom seat and including a support portion for supporting the bread ingredient box, a plurality of spaced-apart support units disposed on the bottom seat and connected to and supporting the top seat, and a sawtooth blade disposed on an inner side of the bottom seat. Each support unit includes an outer support tube extending upward from the bottom seat, an inner post inserted into the outer support tube and extending out of the bottom seat for abutting against the housing, an outer spring sleeved on the outer support tube and having two opposite ends respectively abutting against the top seat and the bottom seat, and an inner spring sleeved on the inner post and having two opposite ends respectively abutting against the inner post and the outer support tube. The sawtooth blade includes a plurality of teeth arranged on a top periphery thereof. The piercing mechanism is movable between a non-piercing state and a piercing state. The teeth of the sawtooth blade is located lower than the support portion when the piercing mechanism is in the non-piercing state, and extend into an inner side of the top seat higher than the support portion when the piercing mechanism is in the piercing state for piercing the sealing film of the bread ingredient box. The top seat is movable relative to the bottom seat when the piercing mechanism is in the piercing state. The outer spring is uncompressed when the piercing mechanism is in the non-piercing state, and is compressed by the top and bottom seats when the piercing mechanism is in the piercing state. The inner spring is compressed by the inner post and the outer support tube when the piercing mechanism is in the non-piercing and piercing states.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Referring to FIGS. 2 to 9, a piercing mechanism according to the embodiment of the present invention is suitable for disposing within a housing of a bread maker (not shown), and is configured to pierce a sealing film 211 of a bread ingredient box 21 (see FIG. 7) which contains bread ingredients. The housing (not shown) includes a base seat 24 having a hollow rectangular cross section, a hollow rectangular base plate 25 mounted on the base seat 24, and a housing cover (not shown). The base seat 24 includes a surrounding wall 241 tapering inwardly from top to bottom. The piercing mechanism of this embodiment comprises a bottom seat 3, four support units 4, two limiting units 5, a sawtooth blade 6, a top seat 7, and a blocking wall 8.

Figure 2:
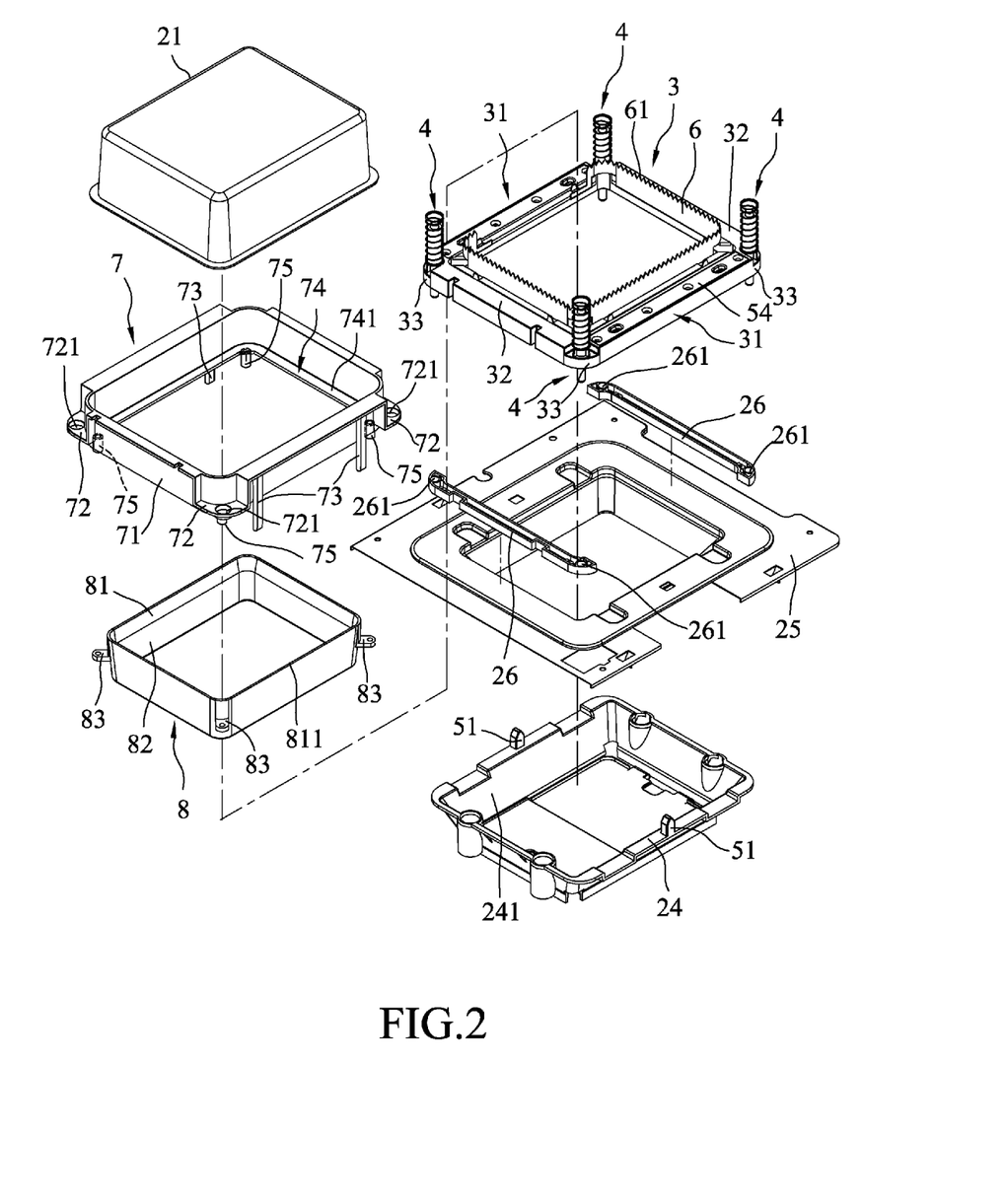
FIG. 2 is an exploded perspective view of a piercing mechanism of a bread maker according to the embodiment of the present invention.
Figure 3:
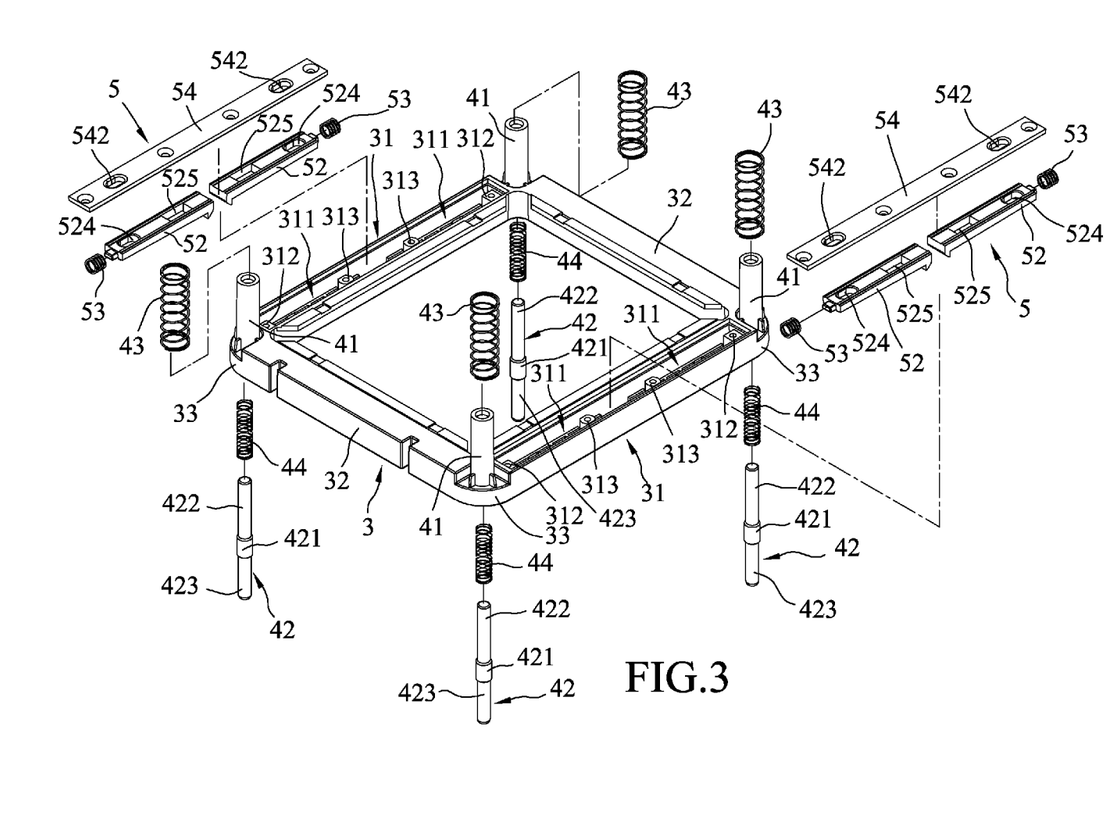
FIG. 3 is an exploded perspective view of a portion of the embodiment.

The bottom seat 3 has a hollow rectangular cross section, and is spaced apart from the base plate 25 in the top-bottom direction. The bottom seat 3 includes two long side portions 31, two short side portions 32 between the long side portions 31, and four bottom corner portions 33 each connected between an end of one of the long side portions 31 and an end of a corresponding one of the short side portions 32. Each long side portion 31 includes two limiting grooves 311 spaced apart in a left-right direction, two abutment pieces 312 respectively disposed on outer ends of the limiting grooves 311, and two studs 313 respectively disposed proximate to inner ends of the limiting grooves 311. Each limiting groove 311 has a through groove portion 315 proximate to a corresponding one of the abutment pieces 312, and an engaging groove portion 314 located between the through groove portion 315 and a corresponding one of the studs 313. Two positioning plates 26 are respectively engaged to bottom sides of the short side portions 32. Each positioning plates 26 has two positioning holes 261 formed in two opposite ends thereof and extending therethrough in a top-bottom direction. Each bottom corner portion 33 has a bottom corner hole 331 extending therethrough in the top-bottom direction and aligned with one of the positioning holes 261 in a corresponding one of the positioning plates 26.

The four support units 41 are disposed on the four bottom corner portions 33 of the bottom seat 3. Each support unit 4 includes an outer support tube 41, an inner post 42 inserted into the outer support tube 41, an outer spring 43 sleeved on the outer support tube 41, and an inner spring 44 sleeved on the inner post 42 and located between the outer support tube 41 and the inner post 42. The outer support tube 41 extends upwardly and integrally from one of the bottom corner portions 33, and has a tubular wall 411 defining a tubular space 412 for extension of the inner post 42 therethrough. The tubular space 412 communicates with the bottom corner hole 331 in the one of the bottom corner portions 33 and one of the positioning holes 261 in the corresponding one of the positioning plates 26.

The inner post 42 has a wide intermediate portion 421 received in the tubular space 412, an upper post portion 422 extending upward from a top end of the intermediate portion and protruding out of a top end of the tubular wall 411, and a lower post portion 423 extending downward from the wide intermediate portion 421 opposite to the upper post portion 422. The wide intermediate portion 421 has a width larger than that of each of the upper and lower post portions 422, 423. The lower post portion 423 extends out of one of the bottom corner holes 331 and a corresponding positioning hole 261 in one of the positioning plates 26 to abut against the base plate 25. The outer spring 43 has two opposite ends respectively abutting against the top seat 7 and one of the bottom corner portions 33. The inner spring 44 has two opposite ends respectively abutting against the top end of the tubular wall 411 and the top end of the wide intermediate portion 421.

Each limiting unit 5 includes a control piece 51 extending upwardly and integrally from one of the long sides of the base seat 24, and two limiting pieces 52, two return springs 53 and a cover plate 54 all disposed in the limiting grooves 311 of a corresponding one of the long side portions 31. The control piece 51 is inserted through the base plate 25, and has an arrow-shaped top end. Each limiting piece 52 includes a push portion 521 extending downward from an inner end thereof and having an inclined end surface 526 inclining downwardly and inwardly, a spring loading portion 522 protruding from an outer end thereof and inserted into one of the return springs 53, an engaging portion 523 between the push portion 521 and the spring loading portion 522, and a first limiting hole 524 and a second limiting hole 525 located on left and right sides of the engaging portion 523. The engaging portion 523 extends downwardly into the engaging groove portion 314 of one of the limiting grooves 311. The first limiting hole 524 is spaced apart from the through groove portion 315 of one of the limiting grooves 311 in the top-bottom direction. The second limiting hole 525 receives one of the studs 313. The return spring 53 is disposed between one of the limiting pieces 52 and one of the abutment pieces 312. The cover plate 54 is screwed to one of the long side portions 31 to close the two adjacent limiting grooves 311 and cover the two adjacent limiting pieces 52, and has two third limiting holes 542 corresponding to and disposed above the first limiting holes 524.

In this embodiment, the sawtooth blade 6 has a substantially U-shaped cross section, and is connected to the two short side portions 32 and one long side portion 31 of the bottom seat 3 at an inner side thereof, as shown in FIG. 2. The sawtooth blade 6 is movable upward and downward along with the bottom seat 3, and includes a plurality of teeth 61 arranged on a top periphery thereof for piercing the sealing film 211 (see FIG. 7) of the bread ingredient box 21.

Figure 4:
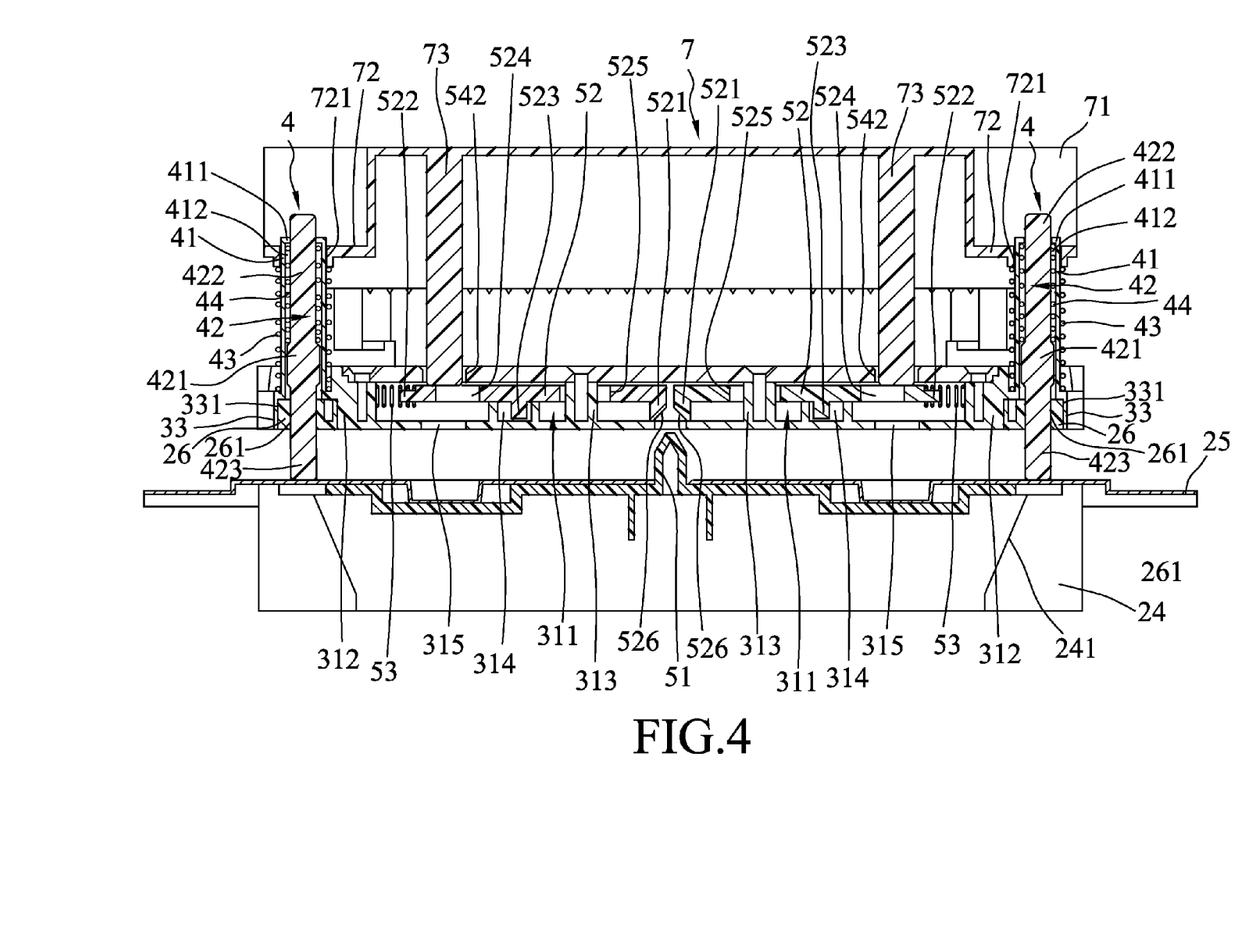
FIG. 4 is an assembled sectional view of the embodiment, illustrating the piercing mechanism in a ready state.
Figure 5:
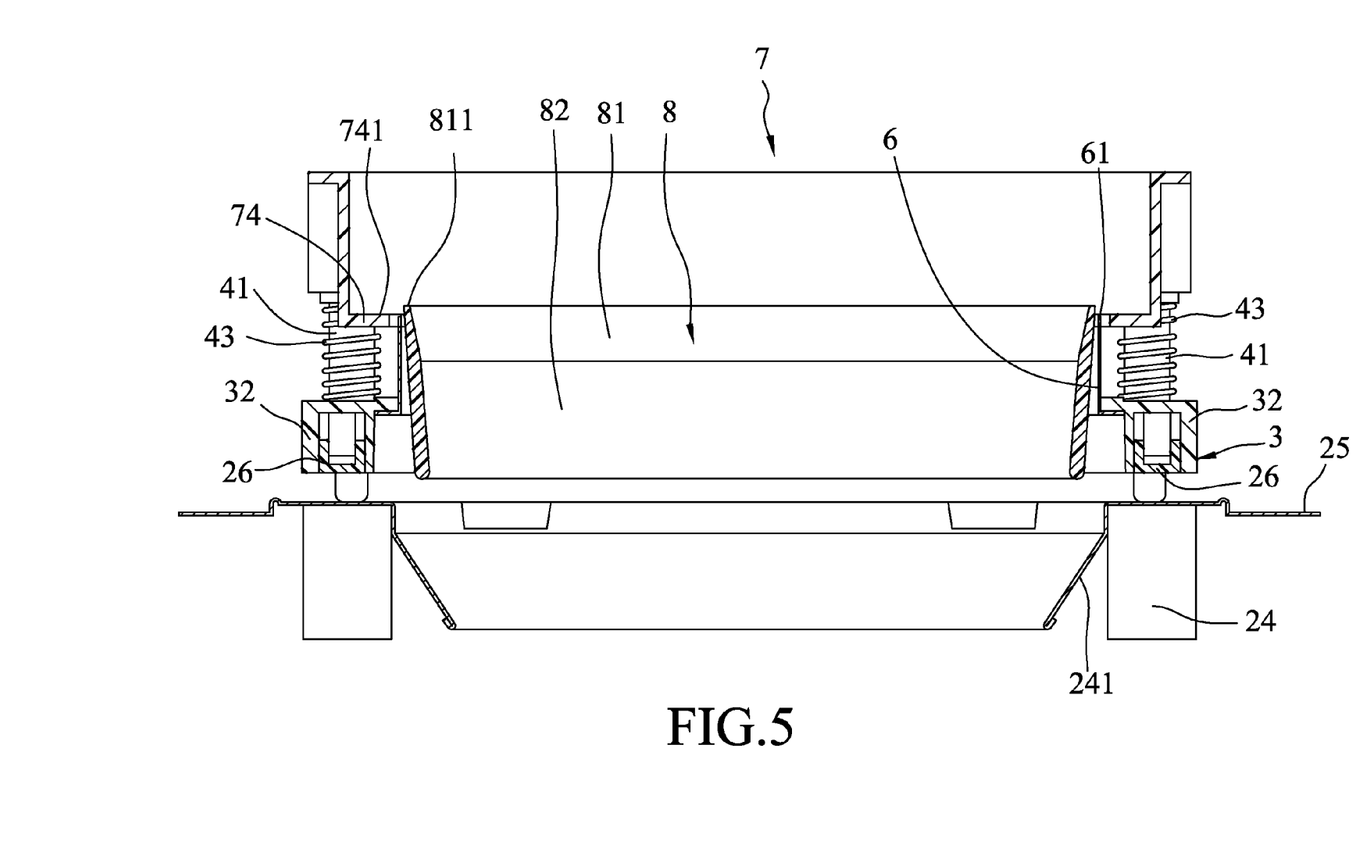
FIG. 5 is another assembled sectional view of the embodiment, illustrating a blocking wall disposed on an inner side of a sawtooth blade.

With reference to FIGS. 2, 4 and 5, the top seat 7 is disposed above the bottom seat 3, and has a hollow rectangular cross section. The top seat 7 includes a rectangular surrounding wall 71, four top corner portions 72 at four corners of the surrounding wall 71, four spaced-apart limiting rods 73 extending downward from a top outer side of the surrounding wall 71, a support portion 74, and four first connection portions 75. Each top corner portion 72 has a top corner hole 721 for extension therethrough of the outer support tube 41 and the inner post 42 of a respective support unit 4, so that each top corner portion 72 can abut against a top end of the outer spring 43 of the respective support unit 4. Each two of the limiting rods 73 are spacedly disposed on a corresponding long side of the surrounding wall 71, and are inserted through the respective third limiting holes 542 so that the bottom ends thereof can abut against the respective limiting pieces 52. The support portion 74 is in the form of an annular flange that extends inwardly from a bottom periphery of the surrounding wall 71 and that has a top supporting surface 741 for supporting the bread ingredient box 21. The four first connection portions 75 extend downward from four corners of the support portion 74. Each first connection portion 75 has a cylindrical body.

The blocking wall 8 has an annular cross section, is connected to the top seat 7, and is located on an inner side of the sawtooth blade 6, as shown in FIG. 5. The blocking wall 8 includes an upper surrounding wall 81 and a lower surrounding wall 82 connected to each other. Each of the upper and lower surrounding walls 81, 82 has a hollow rectangular cross section. Four second connection portions 83 are disposed on four outer corners of the lower surrounding wall 82. The upper surrounding wall 81 has a thickness that gradually decreases from a top end of the lower surrounding wall 82 to a top end thereof. The top end of the upper surrounding wall 81 has a top surface 811. Because the upper surrounding wall 81 is thinner than the lower surrounding wall 82, the area of the top surface 811 is smaller than a cross sectional area of the lower surrounding wall 82, so that accumulation of the bread ingredients on the top surface 811 can be prevented. Each second connection portion 83 is configured as a lug that extends outwardly and horizontally and that abuts against the respective first connection portion 75. The blocking wall 8 is connected to the top seat 7 by fastening the second connection portions 83 to the respective first connection portions 75, so that the blocking wall 8 is movable downward and upward along with the top seat 7.

In a ready state of the piercing mechanism, as shown in FIGS. 4 and 5, the control piece 51 of each limiting unit 5 is spaced apart from the limiting pieces 52 thereof, and the bottom ends of the limiting rods 73 abut against the respective limiting pieces 52 so that the top seat 7 can push the bottom seat 3 to move downward therealong. Further, the inner spring 44 of each support unit 4 is slightly compressed because of the weight the top seat 15, while the outer spring 43 thereof is in an uncompressed state. Moreover, the teeth 61 of the sawtooth blade 6 is located lower than the supporting surface 741 of the support portion 74 and the top surface 811 of the blocking wall 8.

Figure 6:
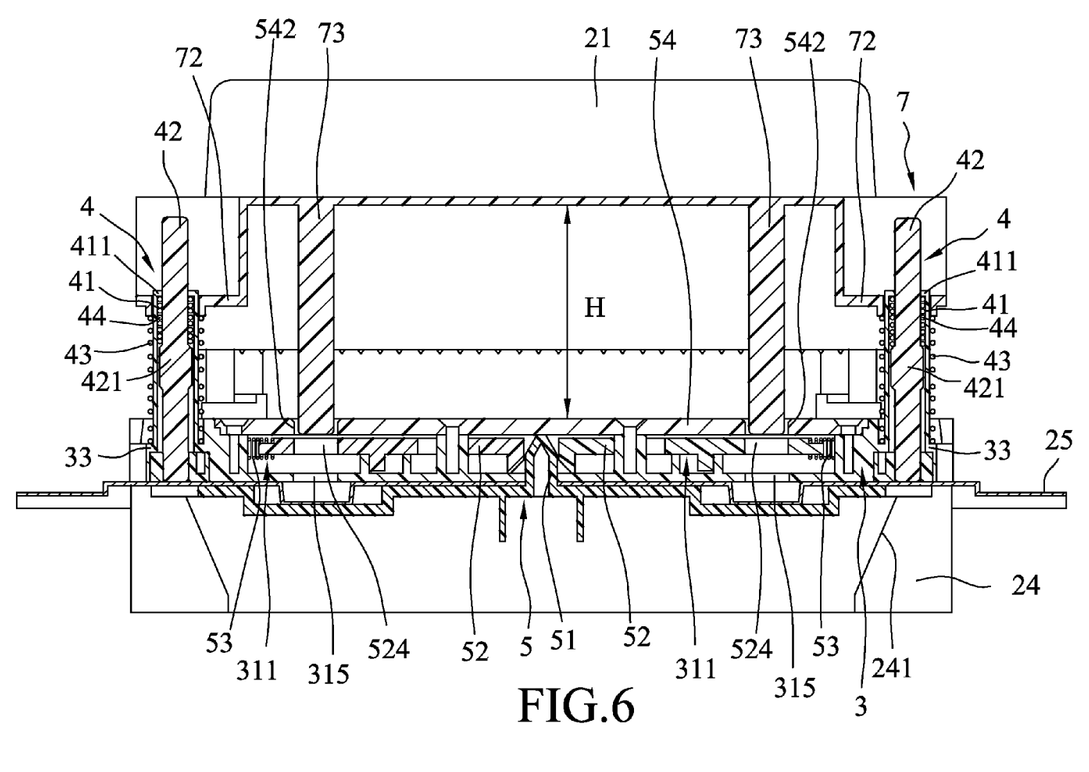
FIG. 6 is a view similar to FIG. 4, but illustrating the piercing mechanism in a non-piercing state.
Figure 7:
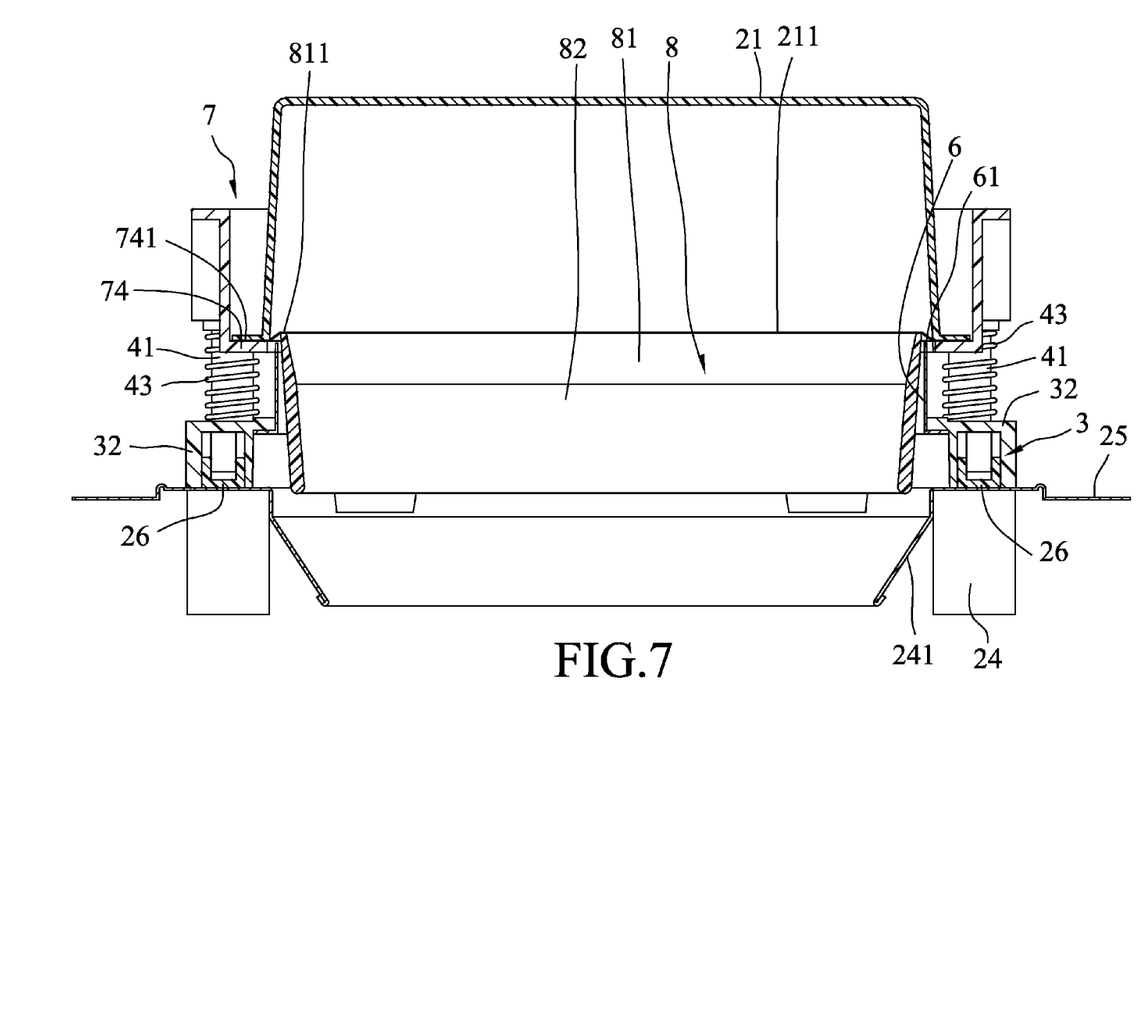
FIG. 7 is a view similar to FIG. 5, but illustrating a bread ingredient box supported on a support portion of a top seat.

The bread ingredient box 21 is then placed on the top seat 7. Because the top seat 7 is pressed by the bread ingredient box 21 to move downward, the top seat 7, in turn, pushes the bottom seat 3 to move downward therealong, thereby moving the piercing mechanism from the ready state to a non-piercing state, as shown in FIGS. 6 and 7. In the non-piercing state, the bottom seat 3 abuts against the base plate 25, the inner spring 44 of each support unit 4 is compressed between the top end of the tubular wall 411 and the top end of the wide intermediate portion 421 thereof, and the control piece 51 of each limiting unit 5 is inserted between the limiting pieces 52 through the guidance of the inclined surfaces 526 thereof, and pushes the limiting pieces 52 away from each other to respectively compress the return springs 53. Simultaneously, the first limiting holes 524 are aligned with the third limiting holes 542 and the through groove portions 315 of the limiting grooves 311. Because the blocking wall 8 moves along with the top seat 7 and the sawtooth blade 6 moves along with the bottom seat 3, the relative distance between the top seat 7 and the bottom seat 3 does not change, so that the teeth 61 of the sawtooth blade 6 are still located lower than the supporting surface 741 of the support portion 74 and the top surface 811 of the blocking wall 8. The top surface 811 of the blocking wall 8 is designed to be slightly higher than the supporting surface 741 of the top seat 7, so that the sealing film 211 is tautened to thereby facilitate piercing by the teeth 61 of the sawtooth blade 6.

Figure 8:
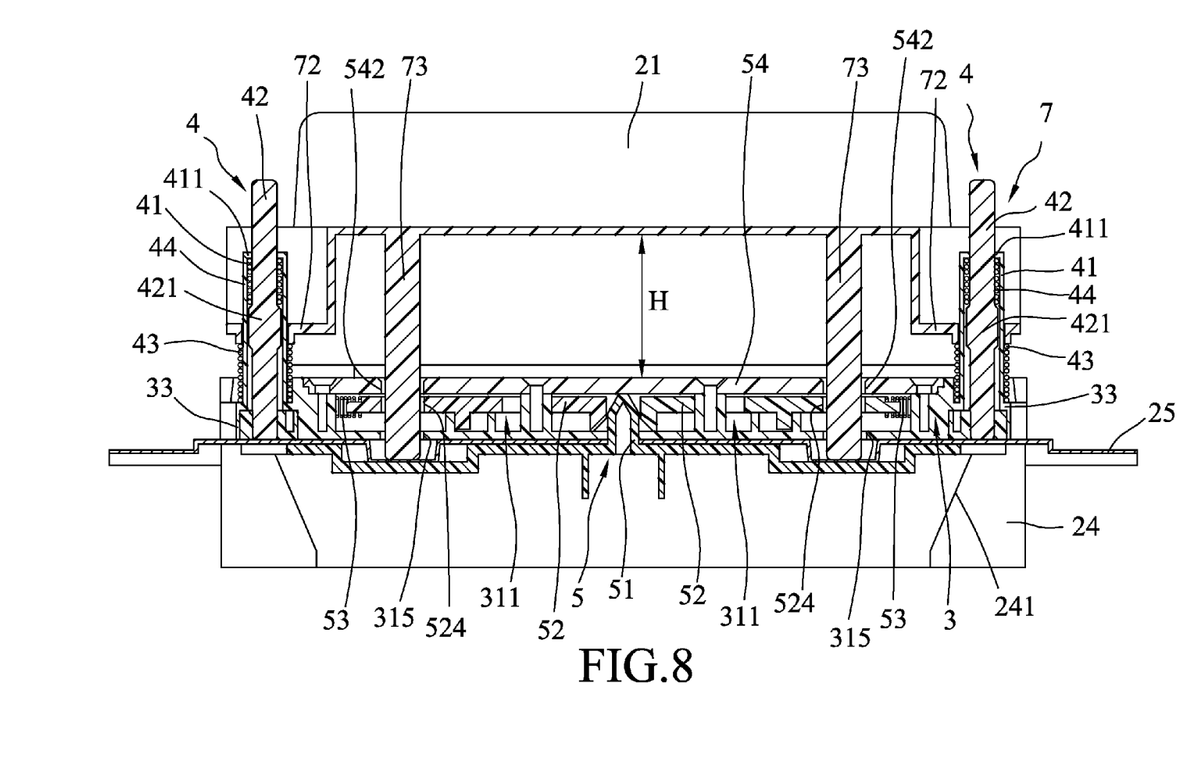
FIG. 8 is a view similar to FIG. 6, but illustrating the piercing mechanism in a piercing state.
Figure 9:
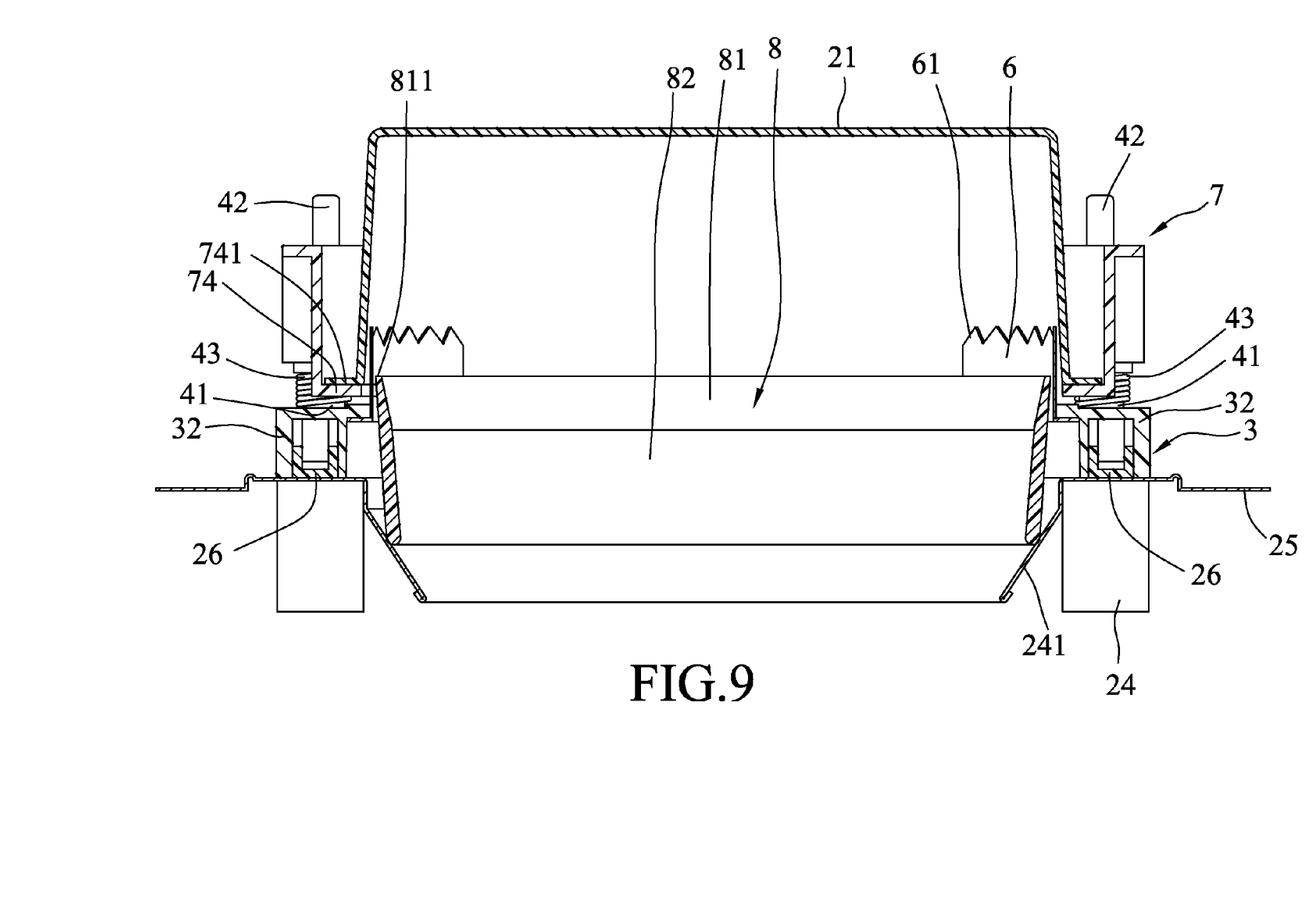
FIG. 9 is a view similar to FIG. 7, but illustrating the piercing mechanism in the piercing state.

A housing of the bread maker is then covered by the housing cover (not shown). Because the bottom seat 3 abuts against the base plate 25 and cannot be moved further downward, and because the bread ingredient box 21 is pressed by the housing cover, the bread ingredient box 21 can continuously press the top seat 7 to move downward relative to the bottom seat 3. Apart from shortening a distance (H) between the top seat 7 and the bottom seat 3, the piercing mechanism is now moved from the non-piercing state to a piercing state, as shown in FIGS. 8 and 9. In the piercing state, the limiting rods 73 of the top seat 7 are inserted through the respective third limiting holes 542, the second limiting holes 525 and the through groove portions 315 to abut against the base plate 25. At this time, the outer spring 43 of each support unit 4 is compressed between one of the top corner portions 72 and the corresponding bottom corner portion 33, and the teeth 61 of the sawtooth blade 6 extend into the inner side of the surrounding wall 71 higher than the supporting surface 741 of the support portion 74 and the top surface 811 of the blocking wall 8 so as to pierce the sealing film 211 of the bread ingredient box 21. Thus, the bread ingredient contained in the bread ingredient box 21 can fall therefrom.

When the making of the bread is completed and the housing cover is open, because the bread ingredient box 21 is no longer pressed by the housing cover, the top and bottom seats 7, 3 can be separated through the restoring forces of the outer springs 43 so as to increase the distance (H) therebetween and to move the limiting rods 73 away from the second limiting holes 525 and the through groove portions 315. Simultaneously, the piercing mechanism is returned to the non-piercing state. Afterwards, the top and bottom seats 7, 3 are together moved upward through the restoring forces of the inner springs 44. Finally, through the restoring forces of the return springs 53, the limiting pieces 52 are moved toward each other until the bottom ends of the limiting rods 73 abut again with the limiting pieces 52. The piercing mechanism is thus moved to the ready state.

In sum, in the piercing mechanism of the bread maker of this invention, the bottom seat 3 uses the inner posts 42 of the support units 4 so as to be supported on the base plate 25. Because there are many supporting points, the stability of the bottom seat 3 can be increased. Therefore, the object of this invention can be realized.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A piercing mechanism of a bread maker suitable for disposing within a housing of a bread maker and configured to pierce a sealing film of a bread ingredient box, said piercing mechanism comprising:
   a bottom seat;
   a top seat disposed above said bottom seat and including a support portion for supporting the bread ingredient box;
   a plurality of spaced-apart support units disposed on said bottom seat and connected to and supporting said top seat, each of said support units including an outer support tube extending upward from said bottom seat, an inner post inserted into said outer support tube and extending out of said bottom seat for abutting against the housing, an outer spring sleeved on said outer support tube and having two opposite ends respectively abutting against said top seat and said bottom seat, and an inner spring sleeved on said inner post and having two opposite ends respectively abutting against said inner post and said outer support tube; and
   a sawtooth blade disposed on an inner side of said bottom seat and including a plurality of teeth arranged on a top periphery thereof;
   wherein said piercing mechanism is movable between a non-piercing state and a piercing state;
   wherein, said teeth of said sawtooth blade is located lower than said support portion when said piercing mechanism is in the non-piercing state, and extend into an inner side of said top seat higher than said support portion when said piercing mechanism is in the piercing state for piercing the sealing film of the bread ingredient box;

wherein said top seat is movable relative to said bottom seat when said piercing mechanism is in the piercing state;

wherein said outer spring is uncompressed when said piercing mechanism is in the non-piercing state, and is compressed by said top and bottom seats when said piercing mechanism is in the piercing state, said inner spring being compressed by said inner post and said outer support tube when said piercing mechanism is in the non-piercing and piercing states.

2. The piercing mechanism as claimed in claim 1, wherein said outer support tube has a tubular wall defining a tubular space for extension of said inner post therethrough, said inner post having a wide intermediate portion received in said tubular space, an upper post portion extending upward from said intermediate portion and protruding out of a top end of said tubular wall, and a lower post portion extending downward from said wide intermediate portion opposite to said upper post portion, said wide intermediate portion having a width larger than that of each of said upper and lower post portions, said lower post portion extending out of said bottom seat, said two opposite ends of said inner spring respectively abutting against said top end of said tubular wall and said wide intermediate portion.

3. The piercing mechanism as claimed in claim 2, further comprising a blocking wall connected to said top seat and located on an inner side of said sawtooth blade, said blocking wall having a top surface that is located higher than said teeth of said sawtooth blade when said piercing mechanism is in the non-piercing state and that is located lower than said teeth of said sawtooth blade when said piercing mechanism is in the piercing state.

4. The piercing mechanism as claimed in claim 3, wherein said blocking wall includes an upper surrounding wall and a lower surrounding wall connected to each other, said upper surrounding wall having a thickness that gradually decreases from a top end of said lower surrounding wall to a top end of said upper surrounding wall.

5. The piercing mechanism as claimed in claim 3, wherein said top surface of said blocking wall is located higher than said support portion of said top seat when said piercing mechanism is in the non-piercing state.

* * * * *